United States Patent
van der Mandele et al.

(10) Patent No.: US 11,895,149 B2
(45) Date of Patent: *Feb. 6, 2024

(54) SELECTIVE TRAFFIC PROCESSING IN A DISTRIBUTED CLOUD COMPUTING NETWORK

(71) Applicant: CLOUDFLARE, INC., San Francisco, CA (US)

(72) Inventors: Achiel Paul van der Mandele, Austin, TX (US); Eric Reeves, Austin, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,484

(22) Filed: Nov. 29, 2022

(65) Prior Publication Data

US 2023/0087129 A1    Mar. 23, 2023

Related U.S. Application Data

(63) Continuation of application No. 16/908,518, filed on Jun. 22, 2020, now Pat. No. 11,546,374.

(51) Int. Cl.
*H04L 9/40*    (2022.01)
*H04L 67/288*    (2022.01)
(Continued)

(52) U.S. Cl.
CPC ...... *H04L 63/1458* (2013.01); *H04L 63/1416* (2013.01); *H04L 63/1425* (2013.01);
(Continued)

(58) Field of Classification Search
CPC ............ H04L 63/1425; H04L 63/1416; H04L 63/1458; H04L 69/325
See application file for complete search history.

(56) References Cited

U.S. PATENT DOCUMENTS 7,945,693 B2 * 5/2011 Farber ................ H04L 67/1025
                                                                709/224
7,949,779 B2 * 5/2011 Farber ...................... H04L 9/40
                                                                709/224

(Continued)

OTHER PUBLICATIONS

Gofen, Smart Mesh Topology Boosts Capacity and Performance, Imperva, Jun. 9, 2020, 4 pages, downloaded at: 4. https://www.imperva.com/blog/smart-mesh-topology-boosts-capacity-and-performance/.

(Continued)

*Primary Examiner* — Douglas B Blair
(74) *Attorney, Agent, or Firm* — NICHOLSON DE VOS WEBSTER & ELLIOTT LLP

(57) ABSTRACT

A server receives internet traffic from a client device. The server is one of multiple servers of a distributed cloud computing network which are each associated with a set of server identity(ies) including a server/data center certification identity. The server processes, at layer 3, the internet traffic including participating in a layer 3 DDoS protection service. If the traffic is not dropped by the layer 3 DDoS protection service, further processing is performed. The server determines whether it is permitted to process the traffic at layers 5-7 including whether it is associated with a server/data center certification identity that meets a selected criteria for the destination of the internet traffic. If the server does not meet the criteria, it transmits the traffic to another one of the multiple servers for processing the traffic at layers 5-7.

18 Claims, 6 Drawing Sheets

(51) Int. Cl.
  *H04L 69/325* (2022.01)
  *H04L 67/01* (2022.01)
  *H04L 67/63* (2022.01)

(52) U.S. Cl.
  CPC ............ *H04L 67/01* (2022.05); *H04L 67/288* (2013.01); *H04L 67/63* (2022.05); *H04L 69/325* (2013.01)

(56) References Cited

U.S. PATENT DOCUMENTS

| | | | |
|---|---|---|---|
| 9,003,035 B1* | 4/2015 | Richardson | H04L 61/301 709/224 |
| 9,639,687 B2 | 5/2017 | Sullivan | |
| 9,787,775 B1* | 10/2017 | Richardson | H04L 67/10 |
| 10,003,466 B1* | 6/2018 | Miller | H04L 69/22 |
| 10,104,039 B1* | 10/2018 | Knecht | H04L 12/4633 |
| 11,546,374 B2* | 1/2023 | van der Mandele | H04L 63/1416 |
| 2004/0215976 A1* | 10/2004 | Jain | H04L 63/1458 726/23 |
| 2006/0072482 A1* | 4/2006 | Voiss | H04L 67/1008 370/254 |
| 2007/0118894 A1* | 5/2007 | Bhatia | H04L 63/168 726/13 |
| 2010/0228963 A1* | 9/2010 | Kassab | G06Q 30/02 713/150 |
| 2014/0207818 A1* | 7/2014 | Jellick | H04L 45/02 707/771 |
| 2017/0048116 A1* | 2/2017 | Anderson | H04L 43/028 |
| 2017/0201571 A1* | 7/2017 | Sherf | H04L 67/1029 |
| 2018/0006912 A1* | 1/2018 | Sokolik | G06F 16/22 |
| 2019/0036908 A1* | 1/2019 | Liu | H04W 12/03 |
| 2019/0166210 A1* | 5/2019 | Froger | H04L 67/1021 |
| 2019/0199695 A1* | 6/2019 | Bhardwaj | G06F 21/602 |
| 2020/0112544 A1* | 4/2020 | Smith | H04L 63/0236 |
| 2020/0186613 A1* | 6/2020 | Johns | G06F 16/29 |
| 2021/0194850 A1* | 6/2021 | Johnson | H04L 63/1408 |

OTHER PUBLICATIONS

McKeever et al. Deploy a Cloud WAF & DDOS Solution While Complying with Australian Data Sovereignty, Imperva, Mar. 4, 2020, 4 pages, downloaded at: https://www.imperva.com/blog/deploy-a-cloud-waf-ddos-solution-while-complying-with-australian-data-sovereignty/.

McKeever, How Imperva Advanced Mesh Topology Keeps Canadian Data In-Country, Imperva, May 24, 2020, 4 pages., downloaded at: https://www.imperva.com/blog/how-imperva-advanced-mesh-topology-keeps-canadian-data-in-country/.

Non-Final Office Action, U.S. Appl. No. 16/908,518, dated May 17, 2022, 9 pages.

Notice of Allowance, U.S. Appl. No. 16/908,518, dated Oct. 3, 2022, 6 pages.

Wilder et al., Data Privacy: How We Restructured the Incapsula Architecture to Provide Regional Isolation Control, Imperva, Apr. 25, 2018, 6 pages, downloaded at: https://www.imperva.com/blog/data-privacy-how-we-restructured-our-incapsula-architecture-to-provide-regional-isolation-control/.

* cited by examiner

SELECTIVE TRAFFIC PROCESSING IN A DISTRIBUTED CLOUD COMPUTING NETWORK

CROSS-REFERENCE TO RELATED APPLICATIONS

This application is a continuation of U.S. application Ser. No. 16/908,518, filed Jun. 22, 2020, which is hereby incorporated by reference.

FIELD

Embodiments of the invention relate to the field of networking; and more specifically, to selective traffic processing in a distributed cloud computing network.

BACKGROUND

Cloud based networks may include multiple servers that are geographically distributed such as throughout the world. The servers may be part of a content delivery network (CDN) that caches or stores content at the servers to deliver content to requesting clients faster with less latency due at least in part to the decreased distance between requesting clients and the content. The servers may also provide other performance features and security features such as protecting against denial of service attacks. Denial of service attacks, including distributed denial of service (DDoS) are common attacks on the internet. Generally speaking, a DDoS attack is where multiple clients transmit a large amount of traffic directed at a target website or application to overwhelm the server(s) handling the website or application.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
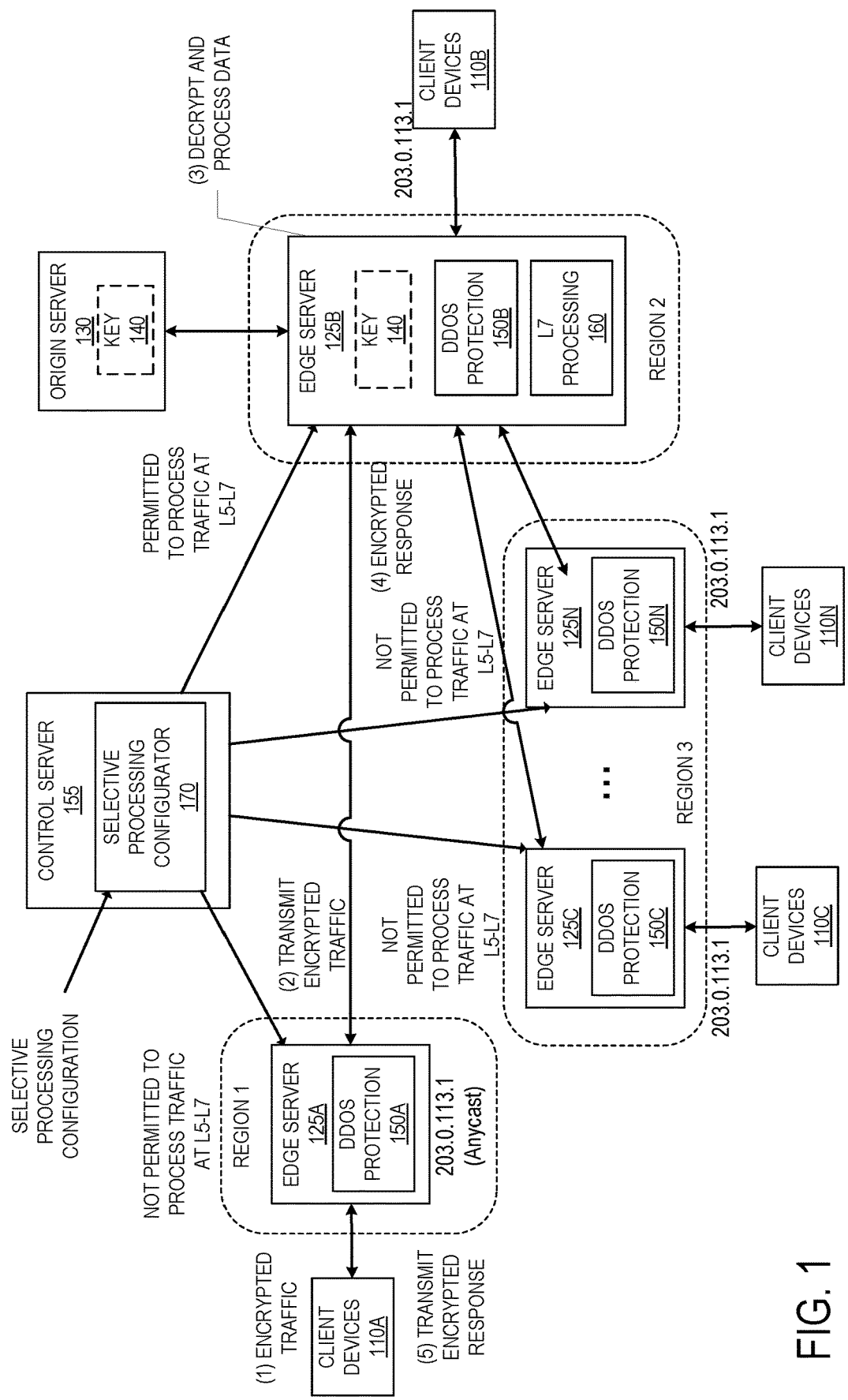
FIG. 1 illustrates a system for selective traffic processing in a distributed cloud computing network according to an embodiment.

Selective traffic processing in a distributed cloud computing network is described. The distributed cloud computing network may provide one or more performance services and/or one or more security services for customers. The one or more performance services can include a content delivery network, caching, video delivery, website optimizations (e.g., asynchronous loading, image optimizations, mobile optimizations), load balancing, intelligent routing, availability, script processing, and/or protocol management (e.g., IPv4/v6 gateway). The one or more security services can include distributed denial of service (DDoS) protection, secure session (SSL/TLS) support, web application firewall, threat blocking, privacy protection, access control, compliance, bot management, and/or rate limiting.

The distributed cloud computing network includes multiple data centers that are geographically distributed. There may be hundreds to thousands of data centers, for example. Each data center includes one or more edge servers. Each data center can also include one or more DNS servers (e.g., one or more authoritative name servers, one or more proxy DNS servers), and/or one or more other pieces of network equipment such as router(s), switch(es), and/or hubs. In an embodiment, each edge server within a data center has the capability of processing network traffic (e.g., HTTP/S, SPDY, FTP, TCP, UDP, IPSec, SIP, other IP protocol traffic, or other network traffic). The description herein will use IP as an example of the network layer. However, other network layer protocol types may be used in embodiments described herein.

IP traffic destined to a destination (e.g., a website or application identified by a domain or IP address) is received at the distributed cloud computing network instead of being initially received at the destination. For instance, in an embodiment, IP address(es) of an origin network are advertised (e.g., using Border Gateway Protocol (BGP)) by the distributed cloud computing network instead of being advertised by the origin network. This causes IP traffic to be received at the distributed cloud computing network instead of being received at the origin network. The IP address(es) of the origin network may be advertised by each of the edge servers as anycast IP address(es) such that IP traffic destined to those IP address(es) are at least initially received at the edge server that is closest to the transmitting device in terms of routing protocol configuration (e.g., BGP configuration) according to an anycast implementation as determined by the network infrastructure (e.g., router(s), switch(es), and/or other network equipment between the transmitting device and the edge servers). In another embodiment, the edge servers advertise a different set of anycast IP address(es) on behalf of the origin and map those anycast IP address(es) to the origin IP address(es). In another embodiment, DNS record(s) for a domain corresponding to the IP traffic may be such that the DNS requests for that domain resolve to IP address(es) of the edge server (which may be anycasted). In another embodiment, instead of an anycast mechanism, a geographical load balancer can be used to route traffic to selected edge servers of the distributed cloud computing network (e.g., the nearest edge server and/or data center to the requesting client). Regardless, IP traffic destined for the origin is routed to one or more of the edge servers.

The performance services and/or security services may be done at different layers in the OSI model. For instance, the distributed cloud computing network may provide a DDoS protection service at layer 3, layer 4, and/or layer 7 of the OSI model to protect against DDoS attacks at a destination (e.g., directed at a domain, IP address). As another example, the distributed cloud computing network may provide higher layer features (e.g., layers 5-7 of the OSI model) such as TLS support, a web application firewall, a content delivery network, caching, video delivery, website optimizations (e.g., asynchronous loading, image optimizations, mobile optimizations), script processing, layer 7 DDoS protection, and/or bot management. The performance services and security services described above are examples and the distributed cloud computing network may perform different services than described.

The customers of the service may provide configuration for selective traffic processing at higher layers in the distributed cloud computing network. The configuration may define which of the edge server(s) is permitted to process their traffic at higher layers (e.g., layers 5-7). The configuration may specify whether the traffic can be forwarded from a non-permitted edge server to a permitted edge server. The configuration provided may be destination based, source based, protocol based, client device based, service based, or any combination thereof, which will be described in greater detail.

In an example, the configuration may select which of the edge servers is permitted to process traffic beyond layer 3 and/or layer 4 (e.g., beyond the network layer (e.g., IP) and the transport layer (e.g., TCP/UDP)) regardless of which edge server receives the traffic from client devices. In such an example, each of the edge servers of the data centers may perform layer 3 and/or layer 4 processing (e.g., layer 3 and/or layer 4 DDoS protection, layer 3 and/or layer 4 firewall protection) while only certain ones of the edge servers are permitted to process traffic at higher layers (e.g., layers 5-7). For example, the IP traffic for a destination may include encrypted content such as HTTPS traffic. The customers of the service may provide configuration that effectively selects which of the edge servers is permitted to process encrypted traffic (e.g., decrypt and further process). For instance, a customer may want or require that encrypted traffic is only decrypted within an EU region (e.g., server(s) within the EU), or a different customer may want or require that traffic is decrypted only within the US region (e.g., server(s) within the United States). As another example, the configuration may specify that traffic received from a particular location can only be decrypted within a certain region (e.g., traffic for US users can only be decrypted by edge servers in the US, traffic for users in the EU can only be decrypted by edge servers in the EU).

In an embodiment, the traffic (e.g., HTTPS or other encrypted traffic) is received at an edge server of any data center of the distributed cloud computing network (e.g., according to an Anycast protocol implementation) regardless of whether that particular edge server is permitted to process the traffic at higher layers (e.g., decrypt and further process the encrypted traffic). If the receiving edge server is not permitted to process the traffic at a higher layer according to the selective configuration applied to that edge server, the receiving edge server transmits the traffic to one of the edge server(s) of the data center(s) that is permitted to process the traffic beyond L3 and/or L4 (sometimes referred herein as a processing edge server or a processing data center). If the receiving edge server is permitted to process the traffic at a higher layer according to the selective configuration applied to that edge server, that receiving edge server processes the traffic at higher layer(s). For example, higher layer processing may be applied to the traffic such as one or more of decrypting, a web application firewall, a content delivery network, caching, video delivery, website optimizations (e.g., asynchronous loading, image optimizations, mobile optimizations), script processing, Layer 7 DDoS protection, and/or bot management.

FIG. 1 illustrates a system for selective traffic processing in a distributed cloud computing network according to an embodiment. The system includes a distributed cloud computing network that includes multiple edge servers 125A-N. The edge servers 125A-N may each be in different geographic regions, such as in data centers located geographically. Although not illustrated in FIG. 1, each data center may also include one or more DNS servers (e.g., authoritative name servers, DNS proxy servers), one or more control servers, and one or more other pieces of network equipment such as router(s), switch(es), and/or hubs. In an embodiment, each edge server 125 may process IP traffic (e.g., HTTP/S, SPDY, FTP, TCP, UDP, IPSec, SIP, or other IP protocol traffic).

The edge servers 125A-N may each operate as a proxy (e.g., a reverse proxy) and receive traffic that is destined for at a destination of a customer (e.g., a destination corresponding to the origin server 130). While FIG. 1 shows an origin server, in some cases there is not an origin server and the traffic is completely serviced within the distributed cloud computing network. The traffic may include requests for network resources (e.g., HTTP or HTTPS requests). The origin server 130 is a computing device on which a network resource resides and/or originates (e.g., web pages, images, word processing documents, PDF files, movie files, music files, or other computer files). In an embodiment, the edge servers 125A-N advertise IP address(es) (e.g., using BGP) of the origin server 130 instead of the being advertised by the origin network. This causes IP traffic to be received at the distributed cloud computing network instead of being received at the origin network. The IP address(es) may be anycast IP address(es) such that IP traffic destined to those IP address(es) is at least initially received at an edge server that is closest to the transmitting device in terms of routing protocol configuration (e.g., BGP configuration) according to an anycast implementation as determined by the network infrastructure (e.g., router(s), switch(es), and/or other network equipment between the transmitting device and the edge servers. For instance, as illustrated in FIG. 1, the IP address 203.0.113.1 is an anycast IP address that is advertised for each of the edge servers 125A-N and traffic received at that IP address is destined for the origin server 130. Accordingly, which of the edge servers 125A-N receives traffic from a client device depends on which edge server is closest to the transmitting client device in terms of routing protocol configuration (e.g., BGP configuration) according to an anycast implementation as determined by the network infrastructure (e.g., router(s), switch(es), and/or other network equipment between the requesting client device and the edge servers 125A-N). In the example of FIG. 1, the client devices 110A-N are closest to the edge servers 125A-N respectively. Thus, traffic from a client device 110A is received at the edge server 125A, traffic from a client device 110B is received at the edge server 125B, and so on.

The control server 155 is a computing device that allows, for example, a customer of the service to provide configuration for selective traffic processing. For instance, the control server 155 includes the selective processing configurator 170 to allow a customer to provide configuration for selective processing. The selective processing configurator 170 may provide, for example, location options and server identity options (e.g., in a drop-down list, in a graphical user interface map, etc.) to select for providing the configuration.

Each of the edge servers 125A-N may be assigned a set of one or more edge server identities including a location identity, a data center identity, an identifier identity, a data center tier type identity, a server manufacturer identity, a country identity, a legal jurisdiction identity, a region identity, a server/data center certification identity (e.g., an ISO-certified identity, a FedRAMP identity, etc.), and/or a server generation identity. These identities are exemplary as the edge servers may be assigned other identities based on properties or features of the edge servers. In the example shown in FIG. 1, the edge server 125A is part of region 1, the edge server 125B is part of region 2, and the edge servers 125C-N are part of region 3.

The location identity may identify the location in which the edge server is located. The location may be a street, a neighborhood, a city, a state, a country, a zip code, a region, GPS coordinates, a continent, or determined by a custom map that allows the customer to define the location. The data center identity may identify the data center of which the edge server is a member. The data center identity may be a number, a name, or other identifier. As previously described, a data center may include multiple edge servers. The identifier identity may identify a particular edge server. Each edge server may have a unique identifier. The data center tier type identity is used for identifying the tier of the data center of which the edge server is a member. In an embodiment, there are multiple data center tiers (e.g., tier 1 to tier N) that represent the relative quality and/or security of the data center. For instance, a tier 1 data center may have relatively higher performance and/or security as compared to a tier 2 data center.

The server manufacturer identity is used to identify the manufacturer of the edge server or a particular component of the edge server (e.g., the processing system of the edge server). Different edge servers may have different manufacturers that may have different processing and/or security capabilities. The server generation identity is used to identify the generation of the edge server which may be used to determine the capabilities of that server (e.g., newer servers may have different capabilities than older servers).

The country identity is used to identify the country in which the edge server and/or data center is located. The legal jurisdiction identity identifies the legal jurisdiction in which the edge server and/or data center is located. The legal jurisdiction identity may be a state, a country, a set of countries/states that are joined together (e.g., the European Union).

The region identity is used to identify the region in which the edge server and/or data center is located. The regions may be defined by the service provider of the distributed cloud computing network and may, at least loosely, correspond with geographic regions. An example region may be Europe. Another example region is the Americas (including North and South America). The regions may also be defined by the customer of the distributed cloud computing network.

The server/data center certification identity is used to identify whether and/or which certifications the server and/or data center have (e.g., ISO-certified, FedRAMP certified). It is possible for a server and/or data center to have multiple certifications by different organizations. The certification may be made by an independent body and/or by the service provider of the distributed cloud computing network. The certifications may include whether the server and/or data center meet certain physical controls (e.g., physically secure with perimeter controls, restricted facility access, onsite security, CCTV, secured server cabinet including locks and physical tamper detection), biometric controlled facility access, whether the servers are in private cages, whether the points of ingress/egress are monitored by an intrusion detection system.

The configuration may include a selection of one or more edge server identities. The configuration provided may be destination based, source based, protocol based, client device based, service based, or any combination thereof. The configuration may specify whether the traffic can be forwarded from a non-permitted edge server to a permitted edge server. As an example, the configuration may include a selection of one or more edge server identities in which traffic processing is permitted (e.g., traffic processing at higher layers such as decryption and further processing of encrypted traffic), and/or a selection of one or more identities in which traffic processing is not permitted (and thus permitted for the unselected identities). In a specific example, the configuration may include a selection of a particular region for which traffic processing at higher layers is only permitted (and thus not permitted in the unselected region(s)).

The configuration may define different traffic processing rules depending on the destination of the traffic. For example, the customer may indicate one or more edge server identities for which processing traffic at higher layers (e.g., layers 5-7) is permitted for the destination and/or for which processing traffic at higher layers (e.g., layers 5-7) is not permitted for the destination. The customer may indicate whether traffic that is received at an unpermitted edge server should be dropped or whether the traffic should be transmitted to a permitted edge server.

The configuration may define different traffic processing rules for different traffic sources. For instance, a customer may specify that traffic received from a certain location (e.g., as determined by source IP address geolocation) is permitted to be processed at certain edge server identities and/or not permitted to be processed in certain edge server identities. By way of example, the configuration may specify that traffic received from client devices in the United States (e.g., as determined by source IP address geolocation) can be processed from edge servers in the United States or edge servers in Europe (and optionally with a preference for the edge servers in the United States), traffic received from client devices in the EU is permitted to be processed from edge servers only in Europe, and traffic received from client devices in Russia are not permitted to be processed (and thus should be dropped).

The configuration may define different traffic processing rules for different traffic protocols. For instance, a customer may specify that traffic having a first protocol (e.g., HTTP) is permitted or not permitted to be processed by a first set of one or more edge server identities and traffic having a second protocol (e.g., FTP) is permitted or not permitted to be processed by a second set of one or more edge server identities.

The configuration may define different traffic processing rules for different types of client device (e.g., user-agent of the client device, manufacturer of the client device, etc.). For example, a customer may specify that traffic from a particular type of client device (e.g., mobile devices) are to be processed at a first set of edge server identities and traffic from a different type of client device (e.g., desktop client devices) are to be processed at a second set of edge server identities. As another example, a customer may specify that traffic from a particular user-agent is to be processed at a first set of edge server identities while traffic from a different user-agent is to be processed at a second set of edge server identities.

The configuration may define different traffic processing rules for different services of the distributed cloud computing network. For instance, a customer may specify that a first service is permitted and/or not permitted to be provided by a first set of one or more edge server identities, and a second service is permitted and/or not permitted to be provided by a second set of one or more edge server identities.

In cases where multiple edge server identities are permitted to process the traffic (e.g., multiple data centers that are permitted to process the traffic) the configuration may define priority information for selecting which of the multiple permitted edge servers to select for processing the traffic.

Based on the configuration, the control server 155 generates a selective traffic processing policy. The control server 155 transmits the selective traffic processing policy to the edge servers 125A-N that reflect the selective processing configuration, which is installed by the edge servers 125A-N. The selective traffic serving policy may provide rule(s) for determining whether, and/or under what condition(s), that particular server is permitted to process traffic (e.g., at layers 5-7 such as decrypting and further processing the traffic) for the particular destination. For instance, for a particular destination (e.g., port/domain pair, port/IP address pair, port/IP address/protocol tuple, domain, or IP address), the selective traffic serving policy may specify that traffic destined to that particular destination is permitted to be processed only by certain edge server(s). The policy may be associated with, or include, one or more routing rules that identify the edge server(s) that are permitted to process traffic at the higher layers and may include a next hop to reach those server(s) (the next hop may be different for different edge servers).

Figure 2:
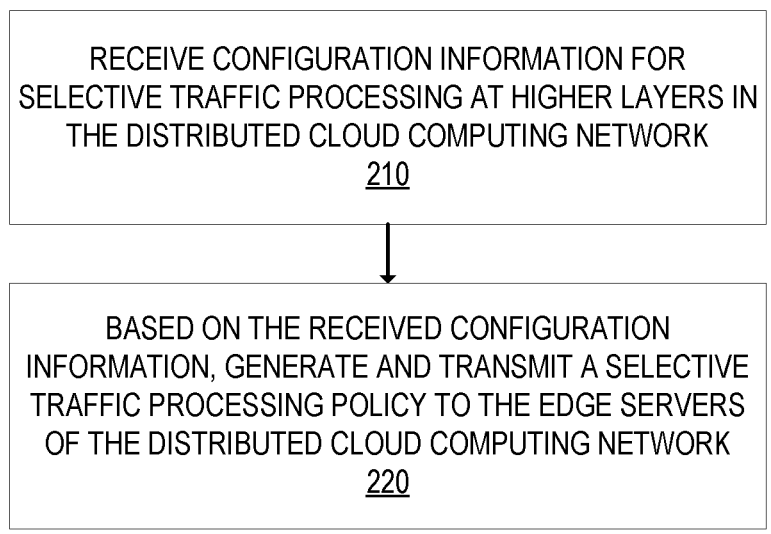
FIG. 2 is a flow diagram that illustrates exemplary operations for configuring selective traffic processing according to an embodiment.

FIG. 2 is a flow diagram that illustrates exemplary operations for configuring selective traffic processing according to an embodiment. The operations of FIG. 2 are described with reference to the exemplary embodiment of FIG. 1. However, the operations of FIG. 2 can be performed by embodiments other than those discussed with reference to FIG. 1, and the embodiments discussed with reference to FIG. 1 can perform operations different than those discussed with reference to FIG. 2.

At operation 210, the control server 155 receives configuration information for selective traffic processing in the distributed cloud computing network. The configuration may be received for a particular destination (e.g., port/domain pair, port/IP address pair, port/IP address/protocol tuple, domain, or IP address) or application. The configuration may specify whether the traffic can be forwarded from a non-permitted edge server to a permitted edge server. The configuration provided may be destination based, source based, protocol based, client device based, service based, or any combination thereof. By way of example, the configuration information may indicate a set of one or more edge servers of multiple edge servers that are permitted to process traffic at higher layers (e.g., layers 5-7) for a particular destination or application. The configuration information may be received from a customer of the service that owns or operates a website or application corresponding to the destination. The configuration may be a selection of one or more edge server identities in which traffic processing at higher layers (e.g., decryption and further processing of encrypted traffic) is permitted, and/or a selection of one or more identities in which traffic processing at higher layers is not permitted (and thus permitted for the unselected identities). By way of example, the configuration may specify which particular edge server(s) or data center(s) are permitted to process traffic at higher layers (e.g., layers 5-7). The configuration may specify that traffic received from a particular location can only be processed at higher layers by edge server(s) that have particular identities. The approximate location of traffic from a client device can be determined through use of a geolocation database based on the IP address of the client device. In an embodiment, the control server 155 provides an interface that allows a customer to provide the configuration (e.g., location options, edge server identity options,) in a drop-down list or a graphical user interface.

Figure 5:
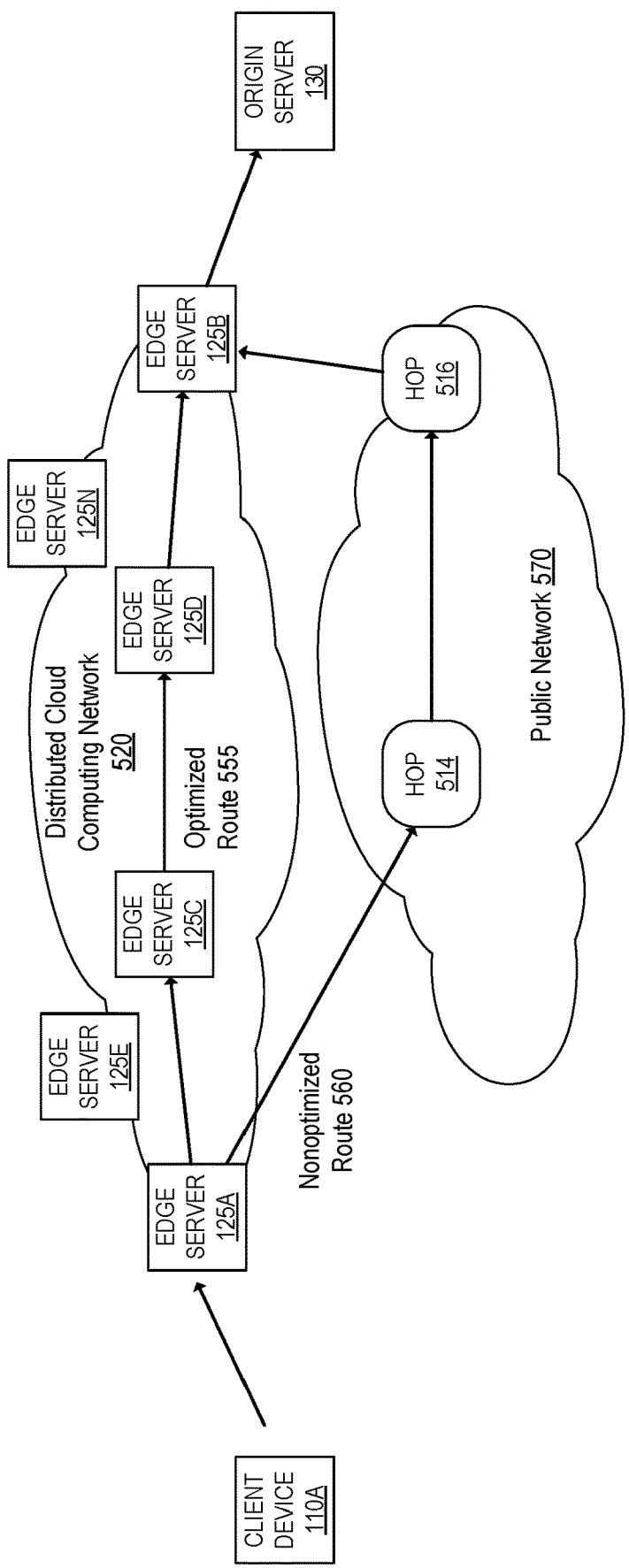
FIG. 5 illustrates an example of IP packets intelligently routed according to an embodiment.

The control server 155 may generate one or more routing rules for routing traffic from a receiving edge server that is not permitted to process the incoming traffic to an edge server that is permitted to process the incoming traffic (a processing edge server). There may be different routes for different edge servers. In an embodiment, the route indicates for a particular destination (e.g., port/domain pair, port/IP address pair, port/IP address/protocol tuple, domain, or IP address) the server(s) that are permitted to process the incoming traffic. The route may also indicate the path that the traffic is to traverse through the distributed cloud computing network. The traffic may be routed through one or more intermediary edge servers based on a set of factor(s) such as latency, speed, reliability, and or cost. FIG. 5 illustrates an example of an optimized route process that may be used in some embodiments.

In some cases, there may be multiple edge server(s) and/or multiple data centers that are permitted to process traffic at higher layers for a particular destination. As an example, the configuration could indicate that any edge server in the distributed cloud computing network is permitted to process traffic at higher layers with the exception of any edge servers in China. In an embodiment, the edge server allocates the same anycast IP address to each server that is permitted to process traffic at higher layers for a particular destination (referred herein as a "selective anycast IP address"). As a result, in such an embodiment, which one of the permitted edge servers receives the traffic from an edge server that is not permitted to process traffic at higher layers is the one that is closest to that edge server in terms of routing protocol configuration (e.g., BGP configuration) according to an anycast implementation as determined by the network infrastructure (e.g., router(s), switch(es), and/or other network equipment between the edge server and the permitted edge servers. In another embodiment, the selection to which of the permitted edge servers traffic is to be transmitted is determined differently (e.g., randomly, round-robin, edge server least recently used, edge server whose corresponding connection has the lowest latency, edge server whose corresponding connection has the highest bandwidth, edge server that has the least amount of processing load, etc.). In such an embodiment, a unicast IP address may be used to address the selected edge server.

Next, at operation 220, based on the received configuration information, the control server 155 generates and transmits a selective traffic processing policy to the edge servers 125A-N. The selective traffic serving policy provides a set of one or more rules for determining whether, and/or under what condition(s), that particular server is permitted to process traffic at higher layers for the destination. The policy may specify one or more conditions and an action to take based on meeting the selected condition(s). The condition(s) may include: the location of the client device that is sending the incoming traffic (e.g., as determined by a geolocation service that may be based on the source IP address of the incoming traffic), the type of the client device that is sending the incoming traffic (e.g., the browser of the client device; the manufacturer of the client device, etc.), the protocol type of the traffic, the service that may apply for the traffic, and/or the destination of the traffic (e.g., the port/domain pair, port/destination IP address pair, port/IP address/protocol tuple, domain, or destination IP address of the incoming traffic). The action to take may specify which edge server or data center to which traffic is to be transmitted (if any) or if local processing is permitted. An exemplary policy may specify that traffic that is destined to a particular destination (e.g., port/domain pair, port/IP address pair, domain, or IP address) is only to be processed at higher layers in one or more identified edge servers (e.g., edge server(s) within Europe). If, for example, this policy is applied to an edge server in the United States, traffic that is destined to that particular destination is transmitted by the edge server in the United States to one of the identified edge server(s) (e.g., edge server(s) within Europe). As an example of a policy with multiple conditions and actions, a policy may specify that traffic received from client devices located in Europe should be processed at higher layers only in edge servers and/or data centers in Europe; and traffic received from client devices located outside of Europe should be processed at higher layers only in edge servers and/or data centers in the United States. If, for example, this policy is applied to an edge server in the United States, the action to take for traffic received from client devices located in the United States is to process the traffic at an edge server in the United States; and the action to take for traffic received from a client device located in Europe is to transmit the traffic to an edge server and/or data center in Europe.

The selective traffic serving policy may also be associated with, or include, a routing rule that may identify which of the edge server(s) are permitted to process traffic at the higher layers (e.g., decrypt and further process the traffic) for the particular destination. For instance, for a particular destination (e.g., port/domain pair, port/IP address pair, port/IP address/protocol tuple, domain, or IP address), the rule may specify which particular edge server(s) that are permitted to permitted to process traffic at the higher layers and may include a next hop to reach those server(s) (the next hop may be different for different edge servers).

Processing at higher layers may include terminating a TLS connection for the destination. In such a case, the control server 155 may cause the private key used during the TLS connection establishment to be installed on only those edge server(s) that are permitted to process traffic at higher layers for the destination. In another embodiment, the control server 155 may encrypt the private key using identity-based broadcast encryption and identity-based revocation encryption so that only those edge server(s) that are permitted to process traffic for the destination can decrypt the piece of data. One technique for using identity-based broadcast encryption and identity-based revocation encryption for encrypting the private key is described in U.S. Pat. No. 10,177,909, titled "Managing Private Key Access in Multiple Nodes", which is incorporated by reference in its entirety.

Referring back to FIG. 1, the selective processing has been configured such that the edge server 125B is the only one of the edge servers 125A-N that is permitted to process traffic at higher layers for a destination corresponding to the origin server 130. Although FIG. 1 illustrates a single edge server as being permitted to process traffic at higher layers, the number of edge servers is exemplary as there may be multiple edge servers that are configured as being permitted to process traffic at higher layers for that destination. In an embodiment, only those edge server(s) that are configured as being permitted to process traffic at higher layers for a particular destination have access to a key (e.g., a private key) used for decrypting the traffic. As illustrated in FIG. 1, the edge server 125B has access to the key 140 that is used for decrypting the encrypted traffic that is destined for a destination corresponding to the origin server 130. As an example, if the encrypted traffic is an HTTPS request, the key 140 may be used during an operation involved in a TLS handshake such as decrypting a premaster secret or signing a message that contains cryptographic parameters that are used to generate the premaster secret (e.g., cipher suites that use Diffie-Hellman for the key exchange). In another embodiment, the key 140 is stored on a remote server from the edge server 125B (e.g., stored on the origin server 130) and the edge server 125B requests the private key operation to be performed by the remote server and receives a result back from the remote server. In the case of TLS, the session keys used to encrypt/decrypt traffic, may only then be stored on the edge server 125B.

Although the edge servers 125A and 125C-N are not permitted to process traffic at higher layers for traffic destined for a destination corresponding to the origin server 130, each of the edge servers 125A-N protect against layer 3 and/or layer 4 DDoS attacks for the destination (and other destinations) as represented by the DDoS protection 150A-N. Those of the edge servers 125A and 125C-N that receive traffic for the destination corresponding to the origin server 130 will transmit the traffic (if not dropped because of the DDoS protection service) to the edge server 125B for higher layer processing.

In an embodiment, those edge servers that are not permitted to process traffic at the higher layers do not log the IP addresses of the transmitting client devices for that traffic. Those edge servers may log that there was a connection but may not log the IP addresses of the transmitting client devices. In an embodiment, a customer can provide configuration for determining what to log and/or where logging can occur. For instance, a customer can provide configuration that indicates that IP addresses of transmitting client devices are not to be logged by edge servers that are not permitted to processing that traffic but can be logged by edge servers that are permitted to process that traffic. As another example, a customer can provide configuration that indicates that no logging of IP addresses is to be done.

With reference to FIG. 1, at operation 1, the edge server 125A receives traffic from one of the client devices 110A that is destined to the destination corresponding to the origin server 130 (e.g., destined to the IP address 203.0.113.1 that corresponds to the destination of the origin server 130). The traffic may be encrypted traffic (e.g., an HTTPS request) that is destined to the destination IP address 203.0.113.1.

As described above, the edge server 125A is configured such that it is not permitted to process traffic at higher layers including decrypting the encrypted traffic. Also, while not being permitted to decrypt the encrypted traffic, the edge server 125A may not be able to decrypt the encrypted traffic because it may not have access to the key(s) for decrypting/encrypting the traffic. For instance, if the traffic is over a TLS connection, the TLS connection may be established between the transmitting client device and one of the edge server(s) that is permitted to process the traffic and that edge server has access to the key(s) for decrypting/encrypting the traffic.

Although the edge server 125A is not permitted to process traffic at higher layers, the edge server 125A can process the traffic at layer 3 and/or layer 4 including participating with the other edge servers 125B-N in a layer 3 and/or layer 4 DDoS protection service to protect against a DDoS attack against the destination. The layer 3 and/or layer 4 DDoS protection may protect against IP floods, TCP floods, UDP floods, GRE floods, and/or ICMP floods. The DDoS protection service may detect and mitigate against layer 3 and/or layer 4 DDoS attacks. A DDoS attack may be identified in several ways that may be different based on the type of attack. Many DDoS attacks involve sending a large amount of traffic of a certain type to an intended target. The DDoS detection may determine when there is an abnormal amount of traffic that is destined to a particular destination (e.g., the traffic spikes from what is normally encountered). The DDoS detection may sample and analyze the traffic looking for inconsistencies and establish a threshold amount of what the normal traffic rate is for a domain and/or IP address and determine when traffic exceeds that threshold. Traffic rates may be individual and separate for an edge server and/or data center and a DDoS attack may be identified for each separate edge server and/or data center; or a DDoS can be identified through an aggregation of traffic across all edge servers and data centers. By way of a specific example, a DDoS attack may be detected by using one or more parameters that exceed a threshold, including one or more of the following to a particular IP address and/or domain: the number of packets, the amount of bandwidth, the number of User Datagram Protocol (UDP) packets/second, the number of Transmission Control Protocol (TCP) packets/second, the number of connections opened, the number of failed connections, and the ratio of successfully opened connections versus failed connections. These are just examples as there may be other parameters used in combination with, or in lieu of, the above to detect a DDoS attack. For example, the distributed cloud computing network may detect if a domain and/or IP address is unreachable due to a heavy load, which may be an indication of a DDoS attack. The DDoS protection may create rules to filter packets that meet certain criteria and install them in a firewall for dropping the packets.

In addition to, or in lieu of, the L3 and/or L4 DDoS protection service, the edge server 125A performs an L3 and/or L4 firewall service in an embodiment. The firewall may be configured with one or more rules (e.g., based on IP address, port, protocol, etc.) to block certain traffic and allow certain traffic.

Assuming that the traffic is not dropped by the edge server 125A because of the DDoS protection service and/or an L3/L4 firewall service, the edge server 125A determines if there are any edge servers 125B-N that are permitted to process the traffic at higher layers. For example, the edge server 125A may access the installed rule(s) and determine that the edge server 125B is permitted to process the traffic at higher layers (e.g., decrypt and process the encrypted traffic). For instance, the edge server 125A may lookup the destination IP address of the traffic in a routing table and see a next hop for that destination IP address to be of the edge server 125B. Accordingly, the edge server 125A transmits the encrypted traffic to the edge server 125B at operation 2. The edge server 125A may transmit the encrypted traffic to the edge server 125B using a layer 4 (e.g., TCP or UDP) mutually-authenticated TLS point to point link. The transmitted encrypted traffic may be transmitted (e.g., transparent proxied) to the edge server 125B such that the encrypted traffic appears to be coming from the transmitting client device 110A.

The traffic may be sent over the public internet between the edge server 125A and the edge server 125B. The route in which the traffic takes (e.g., from the edge server 125A to the edge server 125B) may be determined by conventional routing protocols such as standard BGP, or in some embodiments, intelligently routed through one or more intermediary edge servers based on a set of factor(s) such as latency, speed, reliability, and or cost.

Since the edge server 125B is permitted to process the traffic for the destination at higher layers, at operation 3 the edge server 125B decrypts the encrypted traffic and further processes the decrypted traffic including performing layer 7 processing 160 for the traffic. For instance, if the encrypted traffic is HTTPS traffic, the edge server 125B decrypts the HTTPS traffic and processes the payload. The higher layer processing may include TLS support (in this case terminating the TLS connection between the client device 110A and the edge server 125B), a web application firewall, a content delivery network service, caching, video delivery, website optimizations (e.g., asynchronous loading, image optimizations, mobile optimizations), script processing, layer 7 DDoS protection, and/or bot management. The processing may include the edge server 125B accessing content from the origin server 130.

The edge server 125B may transmit a response to the traffic it processed. For instance, if the traffic is an HTTPS request for a network resource, the edge server 125B may retrieve the requested network resource, generate an HTTPS response, and transmit the HTTPS response to the requesting client device. In an embodiment, the return path for the traffic takes the reverse path as the incoming traffic. For example, in such an embodiment, the edge server 125B transmits the encrypted response (at operation 4) to the edge server 125A which then transmits the encrypted response at operation 5 to the client device 110A. In another embodiment, the edge server 125B performs direct server return and transmits return traffic directly to the client device 110A.

Figure 3:
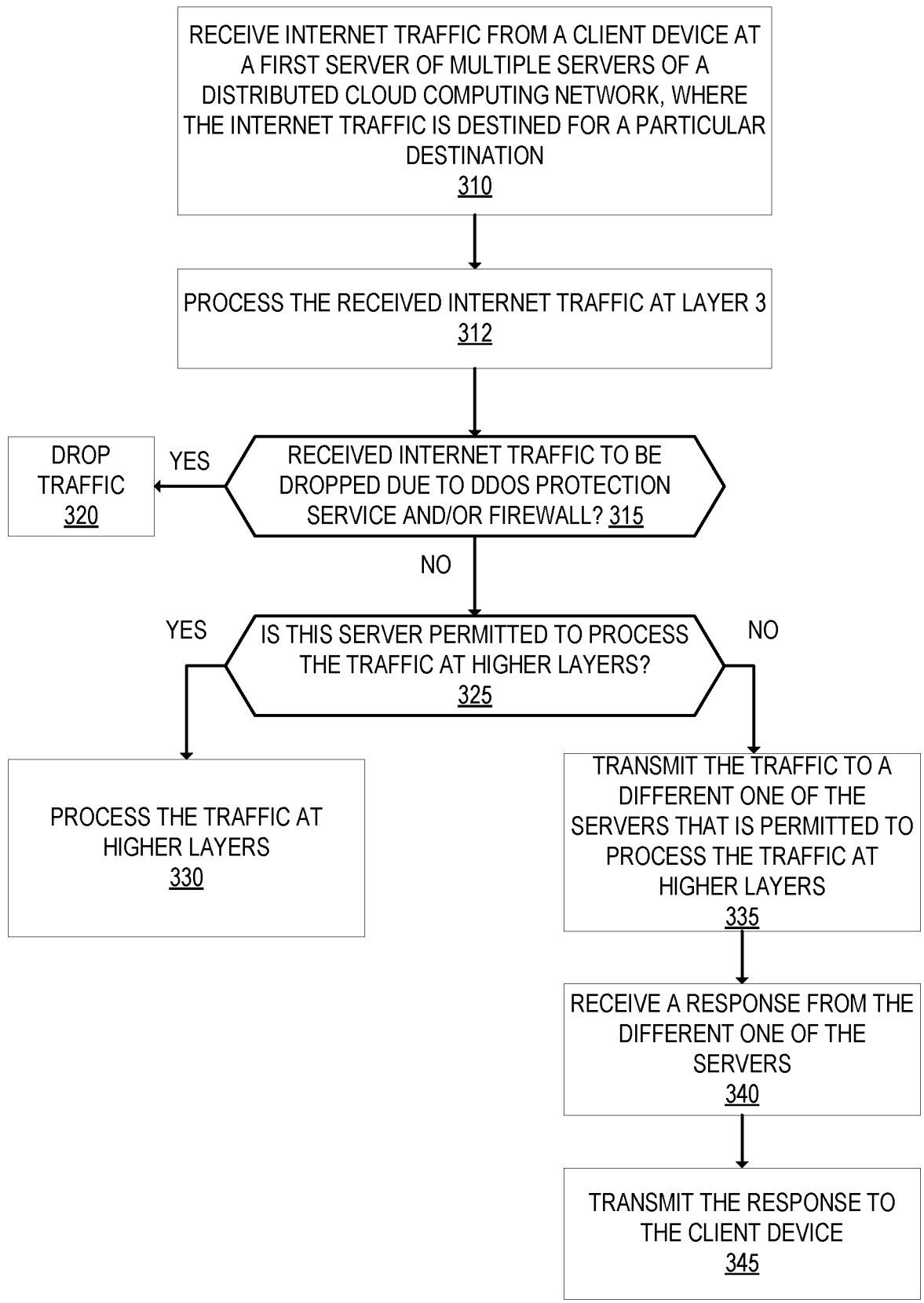
FIG. 3 is a flow diagram that illustrates exemplary operations for selective traffic processing according to an embodiment.

FIG. 3 is a flow diagram that illustrates exemplary operations for selective traffic processing according to an embodiment. The operations of FIG. 3 are described with reference to the exemplary embodiment of FIG. 1. However, the operations of FIG. 3 can be performed by embodiments other than those discussed with reference to FIG. 1, and the embodiments discussed with reference to FIG. 1 can perform operations different than those discussed with reference to FIG. 3.

At operation 310, the edge server 125A of the edge servers 125A-N of the distributed cloud computing network receives internet traffic from a client device 110A. The internet traffic may be IP traffic, for example. The internet traffic is destined for a particular destination (e.g., port/domain pair, port/IP address pair, port/IP address/protocol tuple, domain, or IP address). In an embodiment, the edge servers are each anycasted to a same IP address for the destination and this edge server receives the internet traffic because it is closest to the client device in terms of routing protocol configuration (e.g., BGP configuration) according to an anycast implementation as determined by the network infrastructure (e.g., router(s), switch(es), and/or other network equipment between the transmitting device and the edge servers). For instance, with respect to FIG. 1, each of the edge servers 125A-N have the same anycast IP address 203.0.113.1 such that traffic destined to that IP address is at least initially received at the edge server that is closest to the transmitting device in terms of routing protocol configuration (e.g., BGP configuration) according to an anycast implementation as determined by the network infrastructure (e.g., router(s), switch(es), and/or other network equipment between the transmitting device and the edge servers). Each of the edge servers 125A-N participate in a layer 3 and/or layer 4 DDoS protection service to detect and mitigate DDoS attacks directed at the destination (e.g., port/domain pair, port/IP address pair, port/IP address/protocol tuple, domain, or IP address). The received traffic may include an encrypted piece of data (e.g., the received traffic may be an HTTPS request or otherwise encrypted). In addition to, or in lieu of, the layer 3 and/or layer 4 DDoS protection service, the edge servers 125A-N each perform an L3/L4 firewall service (which may occur after or before the L3/L4 DDoS protection service in the processing chain). As an example, if the edge server 125A determines whether the received traffic is to be dropped due to a rule in the L3/L4 firewall, the traffic will be dropped.

Next, at operation 312, the edge server 125A processes the received internet traffic at layer 3. Processing the received internet traffic at layer 3 may include participating in a layer 3 DDoS protection service to protect against a layer 3 DDoS attack against the destination and/or determining whether the received internet traffic is to be dropped due to a rule in a layer 3 firewall. The received internet traffic may also be processed at layer 4 (e.g., a layer 3 and 4 DDoS protection service and/or a layer 3 and 4 firewall service). With respect to a DDoS protection service, a DDoS attack may be detected by using one or more parameters that exceed a threshold, including one or more of the following to a particular IP address and/or domain: the number of packets, the amount of bandwidth, the number of User Datagram Protocol (UDP) packets/second, the number of Transmission Control Protocol (TCP) packets/second, the number of connections opened, the number of failed connections, and the ratio of successfully opened connections versus failed connections. These are just examples as there may be other parameters used in combination with, or in lieu of, the above to detect a DDoS attack. The DDoS protection service may create rules to filter packets that meet certain criteria and install them in a firewall at the edge server 125A for dropping the packets. As described above, instead of, or in addition to the DDoS protection service, the edge server 125A may determine whether traffic is to be dropped due to a rule in an L3/L4 firewall (which may not have been installed due to a DDoS attack).

At operation 315, the edge server 125A determines whether the received internet traffic is to be dropped due to the DDoS protection service and/or the firewall. If the traffic is to be dropped, then the edge server 125A drops the traffic at operation 320. If the DDoS protection service and/or firewall does not indicate that the traffic is to be dropped, then operation 325 is performed.

At operation 325, the edge server 125A determines whether it is permitted to process the traffic at higher layers (e.g., layers 5-7). For instance, the edge server 125A may access a selective traffic processing policy for the destination of the traffic to determine if the edge server 125A is permitted to process the traffic or if another one of the edge servers 125B-N is permitted to process the traffic. If this edge server (e.g., the edge server 125A) is permitted to process the traffic, then the traffic is processed at operation 330. Processing the traffic at operation 330 may include performing higher layer processing. For example, if the traffic is HTTPS traffic, the edge server may decrypt the HTTPS traffic and further process the decrypted traffic. Other examples include performing functions for a web application firewall, a content delivery network service, caching, video delivery, website optimizations (e.g., asynchronous loading, image optimizations, mobile optimizations), script processing, layer 7 DDoS protection, and/or bot management. The processing may include the edge server accessing content from the origin server 130.

If this edge server is not permitted to process the traffic at higher layers, then at operation 335 the edge server 125A transmits the traffic to a different one of the edge servers 125B-N that is permitted to process the traffic at higher layers. For example, with respect to FIG. 1, the edge server 125A transmits the traffic to an IP address for the edge server 125B. The traffic may be transmitted over a mutually authenticated TLS point to point link. In an embodiment, the routing rule installed on the edge server 125A identifies an edge server and/or data center to which the traffic should be transmitted. For example, the routing rule may specify an IP address that is a selective anycast IP address that is shared among multiple edge servers that are permitted to process the traffic at higher layers. If there are multiple edge servers and/or data centers that are permitted to process the traffic at higher layers, the edge server 125A may, in some embodiments, select which of the edge servers to transmit the traffic. In such an embodiment, the edge server 125A may select which edge server and/or data center using one of the following techniques: randomly, round-robin, edge server or data center least recently used, edge server or data center whose corresponding connection has the lowest latency, edge server or data center whose corresponding connection has the highest bandwidth, edge server or data center that has the least amount of processing load, etc.). The processing edge server receives the traffic and processes the traffic including performing higher layer processing.

In an embodiment, if the edge server is not permitted to process the traffic at higher layers, the edge server does not log the IP addresses of the transmitting client device for that traffic. In the example of FIG. 1, the edge server 125A does not log the IP address of the client device 110A if the edge server 125A is not permitted to process the traffic sent by the client device 110A and destined for the destination corresponding to the origin server 130.

At operation 340, which is optional in some embodiments, the edge server 125A receives a response from the processing edge server (e.g., the edge server 125B). This response may be transmitted over the mutually authenticated TLS point to point link. This response may itself be otherwise encrypted (e.g., an HTTPS response). Next, at operation 345, the edge server 125A transmits the response to the requesting client device 110A.

Operations 340 and 345 describe an example where the return traffic takes the reverse path as the request traffic (e.g., from the processing edge server to the receiving edge server to the client device). However, in some embodiments, the processing edge server performs direct server return and transmits return traffic directly to the client device.

Figure 4:
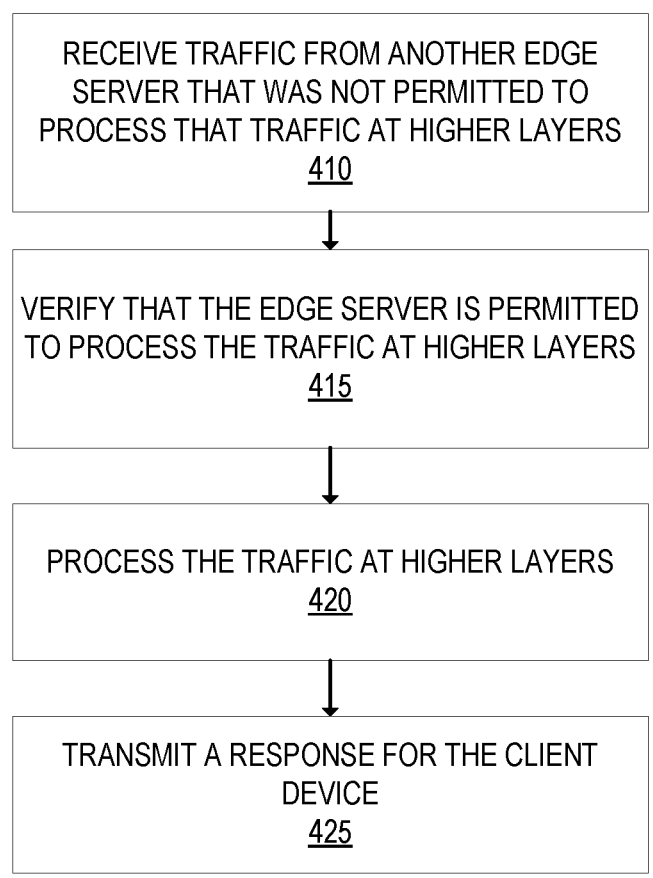
FIG. 4 is a flow diagram that illustrates exemplary operations for selective traffic processing according to an embodiment

FIG. 4 is a flow diagram that illustrates exemplary operations for selective traffic processing according to an embodiment. The operations of FIG. 4 are described with reference to the exemplary embodiment of FIG. 1. However, the operations of FIG. 4 can be performed by embodiments other than those discussed with reference to FIG. 1, and the embodiments discussed with reference to FIG. 1 can perform operations different than those discussed with reference to FIG. 4.

At operation 410, an edge server of the distributed cloud computing network receives traffic that was transmitted by another edge server that was not permitted to process the traffic at higher layers (e.g., traffic sent in operation 335 of FIG. 3). For example, with respect to FIG. 1, the edge server 125B receives traffic from the edge server 125A for which the edge server 125A was not permitted to process. The traffic may be received over a mutually-authenticated TLS point to point link. The traffic itself may be encrypted (e.g., an HTTPS request).

Next, at operation 415, the edge server verifies that it is permitted to process the traffic at higher layers. For example, the edge server 125B may access a selective traffic processing policy for the destination of the traffic to determine if it is permitted to process the traffic. If the edge server is not permitted to process the traffic at higher layers, then an alternative action may be taken (e.g., the traffic is dropped, an error message is returned to the transmitting edge server). Assuming that the edge server is permitted to process the traffic at higher layers, then operation 420 is performed where the edge server processes the traffic at higher layers (e.g., layers 5-7). For example, if the traffic is HTTPS traffic, the edge server may decrypt the HTTPS traffic. Other examples include performing functions for a web application firewall, a content delivery network service, caching, video delivery, website optimizations (e.g., asynchronous loading, image optimizations, mobile optimizations), script processing, layer 7 DDoS protection, and/or bot management. The processing may include the edge server accessing content from the origin server 130. Since the edge server is permitted to process the traffic at higher layers, it may log the IP address of the transmitting client device.

Assuming that processing the traffic at the higher layers elicits a response, the edge server 125B transmits a response for the client device 110A at operation 425. For instance, if the traffic is an HTTPS request for a network resource, the edge server 125B may retrieve the requested network resource, generate an HTTPS response, and transmit the HTTPS response for the requesting client device 110A. In an embodiment, the return path for the traffic takes the reverse path as the incoming traffic. For example, in such an embodiment, the edge server 125B transmits the response to the edge server 125A which then transmits the response at operation to the client device 110A. In another embodiment, the edge server 125B performs direct server return and transmits return traffic directly to the client device 110A.

As previously described, the processing edge server processes the traffic at higher layers (e.g., layers 5-7) including TLS termination, a web application firewall, a content delivery network service, caching, video delivery, website optimizations (e.g., asynchronous loading, image optimizations, mobile optimizations), script processing, layer 7 DDoS protection, and/or bot management.

In an embodiment, the content delivery network service may include caching content at the edge servers 125A-N to deliver content faster with less latency. In addition, when static content is cached in the geographically distributed network of edge servers, the availability of the static content can be maintained even when the origin server fails or goes down. In an embodiment, content caching is based on rules that specify particular behavior for individuals URLs and/or IP addresses, including what content gets cached and how long the content remains cached. Traffic can be load balanced across multiple origins, using proximity and network latency to determine the most efficient destination for each content request. In an embodiment, content is placed on dedicated IP ranges, allowing for prioritized routing and protection.

The content delivery network service may include video delivery services. In an embodiment, the video delivery services provide high quality video streaming through a bundled platform that combines storage, transcoding, distribution and playback functionalities.

In an embodiment, caching service can include automatic static content caching, cache purging, and tiered caching. As noted above, static content caching can conserve CPU resources and bandwidth providing static content from the geographically distributed network of edge servers. In an embodiment, cache purging services using cache-tags stored as metadata with cached objects allows for purging an entire cache or a single file. In an embodiment, using tiered caching, content served from adjacent edge servers can reduce cache-miss rates, server load, and end-to-end latency.

Website optimization services can include asynchronous resource loading, image optimizations, and mobile optimizations. Asynchronous resource loading can allow multiple resources (e.g., images, scripts, etc.) to be loaded simultaneously rather than sequentially. Image optimizations can include resizing images from a single-source image master based on a type of user device and a connection speed. Images can be manipulated by dimensions (e.g., screen size), compression ratios, and format (e.g., WebP conversion where supported). Image optimizations can also include applying both "lossless" and "lossy" image optimizations to remove unnecessary bytes from images. Mobile optimizations can include detecting a browser type of a user device and optimizing performance for the particular type of user device. This can improve the performance of images when a website is accessed via a mobile connection.

The load balancing services may provide local and global load balancing to reduce latency by load balancing traffic across multiple servers or by routing traffic to the closest geolocation region. For example, requests for dynamic content are sourced from origin servers that are either closest to the user or meet specific weighted requirements. The load balancing services may also provide health checks of servers with fast failover to rapidly route users away from failing servers. For example, through periodic HTTP/HTTPS requests, monitoring can be configured for specific URLs with customizable intervals, timeouts, and status codes. Availability monitoring can check the health of origin servers (e.g., as often as every 15 seconds), with reporting via email notifications and a REST API. Thus, when an origin server is marked as unhealthy, multi-region failover can route or reroute traffic to the next available healthy server.

Protocol management services include an IPv4-to-IPv6 translation gateway that can allow any website to be available over IPv6 even when a site's origin network does not yet support the IPv6 protocol. In an embodiment, services that require IPv4 support can use a Pseudo IPv4 service, where an HTTP header is added to requests established over IPv6 with a "pseudo" IPv4 address. In such an embodiment, using a hashing algorithm, Pseudo IPv4 will create a Class E IPv4 address which will produce the same output for the same input; the same IPv6 address will result in the same Pseudo IPv4 address.

Script processing services may allow customers to write and/or deploy scripts (e.g., JavaScript) to be executed on the edge servers 125A-N themselves. For instance, the control server may provide an interface that allows a customer to write and/or deploy one or more scripts and specify when or under what conditions the script(s) should be executed. For instance, the customer may associate a rule that indicates when a script is to be run. By way of example, the control server may allow the customer to configure a URL matching pattern that indicates the URL(s) for which the script is to run.

Secure session support services (e.g., Secure Socket Layer (SSL) and Transport Layer Security (TLS) support) may be provided that allow for SSL to operate in different modes depending on the level of security required and the amount of user configuration. For example, a flexible secure session service encrypts traffic between a processing edge server and a client device, but not between the processing edge server and an origin server, while a full secure session service encrypts the traffic from the processing edge server to the origin server and the client device.

Web application firewall services can run in real-time to prevent automated attacks, SQL injection, XSS javascript injections and other real-time POST actions (e.g., cross-site scripting, cross-site forgery requests, etc.). The web application firewall services can contain rules to thwart attacks commonly seen in popular applications, including: WordPress, Magento, Drupal, PHP, Joomla, etc. In an embodiment, web application firewall services allows an administrator to import their own rules and write custom rules, as well as utilize system-generated rules that are automatically updated when new security vulnerabilities are identified or detected.

Threat blocking and privacy protection security services can include reputation-based threat protection that block known malicious threats, comment spam protection that block spammers from posting on a website, and content scraping protection that protect content (e.g., text, images, email addresses) from web scrapers. Threat blocking security services can also block or present challenges to users by country, IP address, or autonomous system number. Threat blocking security services can also provide user agent blocking to allow a user to create a rule to block or challenge a specific User Agent from accessing a domain, or a zone lockdown to allow the whitelisting of specific IP addresses and IP ranges.

Access control security services can include multi-user access, role-based access, and single sign-on support. Multi-user access allows an administrator to invite other users to manage the account as an administrator. In an embodiment, invited administrators can have full control over the account except for managing members and changing billing information. Role-based access enables organizations to collaborate across one account, and use roles-based permissions to control access. In an embodiment, each user is assigned an individual API key and can use two-factor authentication to protect their own account. Single sign-on support allows for centralized identity and access management by allowing owners to setup and define who can access their accounts with their chosen identity provider.

Access control security services can also enable a user or administrator to monitor user access and change logs. For example, the system can log recent logins, access requests, and policy changes, and provide information indicating affected users, associated IPs, domains, actions taken, and timestamps.

Payment Card Industry Data Security Standards (PCI DSS) is a set of security standards designed to ensure that businesses that accept, process, store, or transmit credit card information maintain a secure environment. In an embodiment, by enabling web application firewall and Modern TLS Only mode ensures that a business remains in compliance with the latest PCI DSS standards.

DDoS attacks can be difficult to mitigate when they originate from a large number of unique IP addresses and mimic legitimate traffic. Rate limiting services can protect against such DDoS attacks, as well as protect sensitive information against brute-force login attempts and other types of abusive behavior. In an embodiment, rate limiting provides the ability to configure thresholds, define responses, and obtain information about specific URLs of websites, applications, or API endpoints. Examples of thresholds can include allowing a certain number of requests per minute from each unique IP address, a certain number of login attempts, etc. Example response configurations can include mitigating actions (e.g., challenges or CAPTCHAS), response codes, etc. Implementation of rate limiting service can reduce bandwidth usage by eliminating unpredictable traffic spikes or attacks.

FIG. 5 illustrates an example of IP packets intelligently routed according to an embodiment. IP traffic may traverse the internet between the edge servers 125A-N. There may be multiple network providers that provide transit connections between the edge servers 125A-N. The different transit connections may have different properties (e.g., different performance characteristics such as latency, speed, and/or reliability; and cost). An optimized route between an entry edge server (the receiving edge server) and the exit edge server (the processing edge server) may be determined and used.

For instance, with respect to FIG. 5, the edge server 125A is the entry edge server (it receives the IP traffic from the client device 110A in this example) and the edge server 125B is the exit edge server (the processing edge server). The optimized route may be based on a set of factors such as latency, speed, reliability, and/or cost, for each of the transit connections. The optimized route may not be the same as the route taken by conventional routing protocols such as standard BGP. For instance, FIG. 5 illustrates a nonoptimized route 560 from the edge server 125A going through the hops (internet nodes) 514 to 516 of the public network 570 (e.g., the public internet) to the edge server 125B. The nonoptimized route 560 may be determined based on conventional routing protocols such as standard BGP and does not take network conditions into account. By way of example, with reference to FIG. 1, the encrypted traffic may traverse from the edge server 125A to the edge server 125B over a nonoptimized route like that of the nonoptimized route 562.

FIG. 5 also illustrates the optimized route 555 that goes from the edge server 125A to the edge server 125C to the edge server 125D to the edge server 125B. Not all the edge servers 125A-N are necessarily part of the optimized route. For instance, the edge servers 125E-N are not part of the optimized route. The optimized route 555, when compared to the nonoptimized route 560, may have lower latency, higher speed, more reliability, and/or lower cost.

In an embodiment, the IP packets are encapsulated (e.g., using UDP) for transit between the edge servers on the optimized route and include information that aids in routing. In an embodiment, the encapsulating header includes the full path the IP packet should traverse through the distributed cloud computing network 520. The full path can be encoded as a list of hops where each hop is an identifier of an edge server 125 (e.g., not a full IP address). In this embodiment, the receiving edge server 125A determines the full path (e.g., looks up the path in an optimized route storage based on the destination address) and encodes the full path in the encapsulating header. Each intermediate edge server 125 can then use the path encoded in the encapsulating header to route the IP traffic instead of accessing the optimized route storage to determine the next hop.

In an embodiment, the encapsulating header includes a hash or identifier of the full path that is stored in optimized route storage on each of the edge servers 125A-N that is keyed by the hash or identifier. In such an embodiment, the receiving edge server 125 determines the full path (e.g., looks up the path in optimized route storage based on the destination address) and encodes the hash or identifier in the encapsulating header. Each intermediate edge server can then use the encoded hash or identifier to determine the path.

In an embodiment, the encapsulating header includes a hash or other identifier that represents a specific routing policy (e.g., stored in optimized route storage) that is used for the optimized route. For instance, a routing policy may be: fastest by latency, lowest jitter, lowest packet loss, cheapest by bandwidth, data sovereignty policies (e.g., don't route through a particular geographic region), etc. In such an embodiment, the receiving edge server 125 determines the routing policy to apply (e.g., looks up the routing policy in the optimized route storage based on the destination address and/or source address), and includes the hash or other identifier in the metadata of the encapsulating header. This allows each edge server of the optimized route to consistently apply the same routing policy(ies).

Figure 6:
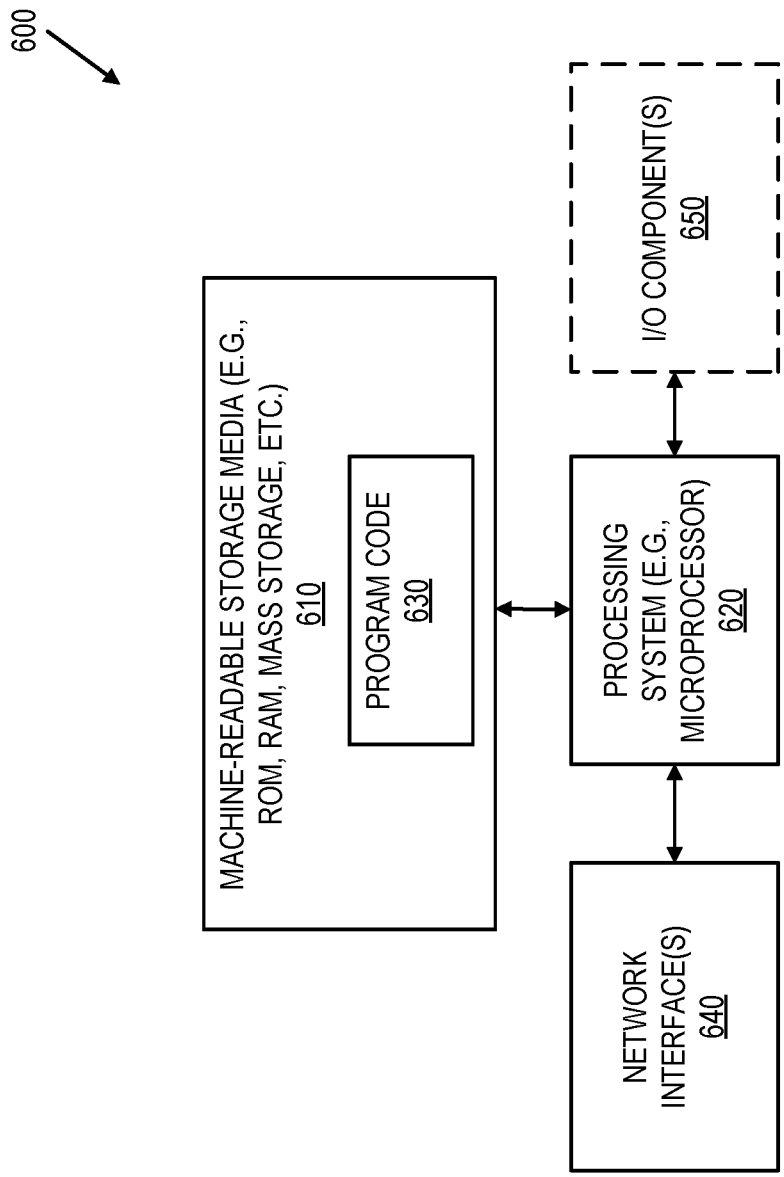
FIG. 6 illustrates a block diagram for an exemplary data processing system that may be used in some embodiments.

FIG. 6 illustrates a block diagram for an exemplary data processing system 600 that may be used in some embodiments. One or more such data processing systems 600 may be used to implement the embodiments and operations described with respect to the edge servers or other electronic devices. The data processing system 600 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 610 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 620 (e.g., one or more processors and connected system components such as multiple connected chips). For example, the depicted machine-readable storage media 610 may store program code 630 that, when executed by the processor(s) 620, causes the data processing system 600 to perform any of the operations described herein.

The data processing system 600 also includes one or more network interfaces 640 (e.g., a wired and/or wireless interfaces) that allows the data processing system 600 to transmit data and receive data from other computing devices, typically across one or more networks (e.g., Local Area Networks (LANs), the Internet, etc.). The data processing system 600 may also include one or more input or output ("I/O") components 650 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 600, and, in certain embodiments, fewer components than that shown in One or more buses may be used to interconnect the various components shown in FIG. 6.

The techniques shown in the figures can be implemented using code and data stored and executed on one or more electronic devices (e.g., a compute server, a client device, a router, an origin server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth in order to provide a more thorough understanding of the present embodiments. It will be appreciated, however, by one skilled in the art that the invention may be practiced without such specific details. In other instances, control structures, gate level circuits and full software instruction sequences have not been shown in detail in order not to obscure understanding of the embodiments. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
    receiving first internet traffic from a first client device at a first server of a plurality of servers of a distributed cloud computing network, wherein the first internet traffic is destined for a first destination, wherein each of the plurality of servers is associated with a set of one or more server identities including a server/data center certification identity;
    processing, at layer 3, the first internet traffic destined for the first destination including participating in a layer 3 distributed denial of service (DDoS) protection service to protect against a layer 3 DDoS attack against the first destination;
    determining that the received first internet traffic is not to be dropped by the layer 3 DDoS protection service;
    determining that the first server is not permitted to process the received first internet traffic at layers 5-7, wherein the server/data center certification identity associated with the first server of the plurality of servers does not meet a selected criteria for processing internet traffic at layers 5-7;
determining that a second server of the plurality of servers is permitted to process the received first internet traffic at layers 5-7, and wherein the server/data center certification identity associated with the second server of the plurality of servers meets the selected criteria for processing internet traffic at layers 5-7;
transmitting the first internet traffic to the second server of the plurality of servers for processing the first internet traffic at layers 5-7;
receiving second internet traffic from a second client device at the first server of a plurality of servers of a distributed cloud computing network, wherein the second internet traffic is destined for a second destination;
processing, at layer 3, the second internet traffic destined for the second destination including participating in a layer 3 distributed denial of service (DDoS) protection service to protect against a layer 3 DDoS attack against the second destination;
determining that the received second internet traffic is not to be dropped by the layer 3 DDoS protection service;
determining that a policy for selective traffic processing at layers 5-7 applies to the received second internet traffic, wherein the policy indicates that internet traffic received from a first location is permitted to be processed at layers 5-7 only by servers in a second location, wherein the first server is not in the second location;
determining that the received second internet traffic is received from the first location; and
transmitting the second internet traffic to a server in the second location.

2. The method of claim 1, further comprising:
wherein the set of one or more server identities further includes at least one of a location identity, a data center identity, an identifier identity, a data center tier type identity, a server manufacturer identity, a country identity, a legal jurisdiction identity, a region identity, and a server generation identity, or any combination thereof; and
wherein the set of server identities further associated with the first server does not meet the selected criteria for processing internet traffic at layers 5-7 and wherein the set of server identities further associated with the second server meets the selected criteria for processing internet traffic at layers 5-7.

3. The method of claim 1, further comprising:
wherein the first internet traffic includes an HTTPS request;
wherein the first server does not have access to a key to decrypt the HTTPS request; and
wherein the second server has access to the key to decrypt the HTTPS request.

4. The method of claim 1, further comprising:
receiving, at the first server from the second server, a response to the transmitted first internet traffic; and
transmitting the response from the first server to the first client device.

5. The method of claim 1, further comprising:
receiving second internet traffic from a second client device at the first server of a plurality of servers of a distributed cloud computing network, wherein the second internet traffic is destined for a second destination;
processing, at layer 3, the second internet traffic destined for the second destination including participating in a layer 3 distributed denial of service (DDoS) protection service to protect against a layer 3 DDoS attack against the second destination;
determining that the received second internet traffic is not to be dropped by the layer 3 DDoS protection service;
determining that the first server is not permitted to process the received second internet traffic at layers 5-7;
determining that at least a first set of one or more third servers and a second set of one or more fourth servers are permitted to process the received second internet traffic at layers 5-7, wherein the first set of one or more third servers are reachable at a first IP address and the second set of one or more fourth servers are reachable at a second IP address;
responsive to the determining that the first server is not permitted to process the received second internet traffic at layers 5-7 and to the determining that the at least the first set of third servers and the second set of fourth servers are permitted to process the received second internet traffic at layers 5-7, selecting, from the at least the first set of third servers and the second set of fourth servers, the first set of third servers; and
transmitting the second internet traffic from the first server to the first IP address.

6. The method of claim 5, wherein selecting the first set of third servers includes determining latency to the first set of third servers and determining latency to the second set of fourth servers, wherein the first set of third servers is associated with a lower determined latency compared to the second set of fourth servers.

7. A non-transitory machine-readable storage medium that provides instructions that, when executed by a processor, causes the processor to perform operations comprising:
receiving first internet traffic from a first client device at a first server of a plurality of servers of a distributed cloud computing network, wherein the first internet traffic is destined for a first destination, wherein each of the plurality of servers is associated with a set of one or more server identities including a server/data center certification identity;
processing, at layer 3, the first internet traffic destined for the first destination including participating in a layer 3 distributed denial of service (DDoS) protection service to protect against a layer 3 DDoS attack against the first destination;
determining that the received first internet traffic is not to be dropped by the layer 3 DDoS protection service;
determining that the first server is not permitted to process the received first internet traffic at layers 5-7, wherein the server/data center certification identity associated with the first server of the plurality of servers does not meet a selected criteria for processing internet traffic at layers 5-7;
determining that a second server of the plurality of servers is permitted to process the received first internet traffic at layers 5-7, and wherein the server/data center certification identity associated with the second server of the plurality of servers meets the selected criteria for processing internet traffic at layers 5-7;
transmitting the first internet traffic to the second server of the plurality of servers for processing the first internet traffic at layers 5-7;
receiving second internet traffic from a second client device at the first server of a plurality of servers of a distributed cloud computing network, wherein the second internet traffic is destined for a second destination;
processing, at layer 3, the second internet traffic destined for the second destination including participating in a layer 3 distributed denial of service (DDoS) protection service to protect against a layer 3 DDoS attack against the second destination;
determining that the received second internet traffic is not to be dropped by the layer 3 DDoS protection service;
determining that a policy for selective traffic processing at layers 5-7 applies to the received second internet traffic, wherein the policy indicates that internet traffic received from a first location is permitted to be processed at layers 5-7 only by servers in a second location, wherein the first server is not in the second location;
determining that the received second internet traffic is received from the first location; and
transmitting the second internet traffic to a server in the second location.

8. The non-transitory machine-readable storage medium of claim 7, wherein the operations further comprise:
wherein the set of one or more server identities further includes at least one of a location identity, a data center identity, an identifier identity, a data center tier type identity, a server manufacturer identity, a country identity, a legal jurisdiction identity, a region identity, and a server generation identity, or any combination thereof; and
wherein the set of server identities further associated with the first server does not meet the selected criteria for processing internet traffic at layers 5-7 and wherein the set of server identities further associated with the second server meets the selected criteria for processing internet traffic at layers 5-7.

9. The non-transitory machine-readable storage medium of claim 7, wherein the operations further comprise:
wherein the first internet traffic includes an HTTPS request;
wherein the first server does not have access to a key to decrypt the HTTPS request; and
wherein the second server has access to the key to decrypt the HTTPS request.

10. The non-transitory machine-readable storage medium of claim 7, wherein the operations further comprise:
receiving, at the first server from the second server, a response to the transmitted first internet traffic; and
transmitting the response from the first server to the first client device.

11. The non-transitory machine-readable storage medium of claim 7, wherein the operations further comprise:
receiving second internet traffic from a second client device at the first server of a plurality of servers of a distributed cloud computing network, wherein the second internet traffic is destined for a second destination;
processing, at layer 3, the second internet traffic destined for the second destination including participating in a layer 3 distributed denial of service (DDoS) protection service to protect against a layer 3 DDoS attack against the second destination;
determining that the received second internet traffic is not to be dropped by the layer 3 DDoS protection service;
determining that the first server is not permitted to process the received second internet traffic at layers 5-7;
determining that at least a first set of one or more third servers and a second set of one or more fourth servers are permitted to process the received second internet traffic at layers 5-7, wherein the first set of one or more third servers are reachable at a first IP address and the second set of one or more fourth servers are reachable at a second IP address;
responsive to the determining that the first server is not permitted to process the received second internet traffic at layers 5-7 and to the determining that the at least the first set of third servers and the second set of fourth servers are permitted to process the received second internet traffic at layers 5-7, selecting, from the at least the first set of third servers and the second set of fourth servers, the first set of third servers; and
transmitting the second internet traffic from the first server to the first IP address.

12. The non-transitory machine-readable storage medium of claim 11, wherein selecting the first set of third servers includes determining latency to the first set of third servers and determining latency to the second set of fourth servers, wherein the first set of third servers is associated with a lower determined latency compared to the second set of fourth servers.

13. A server, comprising:
a processor; and
a non-transitory machine-readable storage medium that provides instructions that, when executed by the processor, will cause the server to perform the following operations:
receiving first internet traffic from a first client device at a first server of a plurality of servers of a distributed cloud computing network, wherein the first internet traffic is destined for a first destination, wherein each of the plurality of servers is associated with a set of one or more server identities including a server/data center certification identity;
processing, at layer 3, the first internet traffic destined for the first destination including participating in a layer 3 distributed denial of service (DDoS) protection service to protect against a layer 3 DDoS attack against the first destination;
determining that the received first internet traffic is not to be dropped by the layer 3 DDoS protection service;
determining that the first server is not permitted to process the received first internet traffic at layers 5-7, wherein the server/data center certification identity associated with the first server of the plurality of servers does not meet a selected criteria for processing internet traffic at layers 5-7;
determining that a second server of the plurality of servers is permitted to process the received first internet traffic at layers 5-7, and wherein the server/data center certification identity associated with the second server of the plurality of servers meets the selected criteria for processing internet traffic at layers 5-7;
transmitting the first internet traffic to the second server of the plurality of servers for processing the first internet traffic at layers 5-7;
receiving second internet traffic from a second client device at the first server of a plurality of servers of a distributed cloud computing network, wherein the second internet traffic is destined for a second destination;
processing, at layer 3, the second internet traffic destined for the second destination including participating in a layer 3 distributed denial of service (DDoS)

protection service to protect against a layer 3 DDoS attack against the second destination;

determining that the received second internet traffic is not to be dropped by the layer 3 DDoS protection service;

determining that a policy for selective traffic processing at layers 5-7 applies to the received second internet traffic, wherein the policy indicates that internet traffic received from a first location is permitted to be processed at layers 5-7 only by servers in a second location, wherein the first server is not in the second location;

determining that the received second internet traffic is received from the first location; and transmitting the second internet traffic to a server in the second location.

14. The server of claim 13, wherein the operations further comprise:

wherein the set of one or more server identities further includes at least one of a location identity, a data center identity, an identifier identity, a data center tier type identity, a server manufacturer identity, a country identity, a legal jurisdiction identity, a region identity, and a server generation identity, or any combination thereof; and wherein the set of server identities further associated with the first server does not meet the selected criteria for processing internet traffic at layers 5-7 and wherein the set of server identities further associated with the second server meets the selected criteria for processing internet traffic at layers 5-7.

15. The server of claim 13, wherein the operations further comprise:

wherein the first internet traffic includes an HTTPS request;

wherein the first server does not have access to a key to decrypt the HTTPS request; and wherein the second server has access to the key to decrypt the HTTPS request.

16. The server of claim 13, wherein the operations further comprise:

receiving, at the first server from the second server, a response to the transmitted first internet traffic; and transmitting the response from the first server to the first client device.

17. The server of claim 13, wherein the operations further comprise:

receiving second internet traffic from a second client device at the first server of a plurality of servers of a distributed cloud computing network, wherein the second internet traffic is destined for a second destination;

processing, at layer 3, the second internet traffic destined for the second destination including participating in a layer 3 distributed denial of service (DDoS) protection service to protect against a layer 3 DDoS attack against the second destination;

determining that the received second internet traffic is not to be dropped by the layer 3 DDoS protection service;

determining that the first server is not permitted to process the received second internet traffic at layers 5-7;

determining that at least a first set of one or more third servers and a second set of one or more fourth servers are permitted to process the received second internet traffic at layers 5-7, wherein the first set of one or more third servers are reachable at a first IP address and the second set of one or more fourth servers are reachable at a second IP address;

responsive to the determining that the first server is not permitted to process the received second internet traffic at layers 5-7 and to the determining that the at least the first set of third servers and the second set of fourth servers are permitted to process the received second internet traffic at layers 5-7, selecting, from the at least the first set of third servers and the second set of fourth servers, the first set of third servers; and transmitting the second internet traffic from the first server to the first IP address.

18. The server of claim 17, wherein selecting the first set of third servers includes determining latency to the first set of third servers and determining latency to the second set of fourth servers, wherein the first set of third servers is associated with a lower determined latency compared to the second set of fourth servers.

* * * * *